(12) United States Patent
Li et al.

(10) Patent No.: US 11,807,797 B2
(45) Date of Patent: Nov. 7, 2023

(54) DYNAMIC THERMAL INFRARED STEALTH COMPOSITE MATERIAL BASED ON DUAL PHASE CHANGE AND PREPARATION METHOD THEREOF

(71) Applicant: CHANGSHA UNIVERSITY OF SCIENCE & TECHNOLOGY, Changsha (CN)

(72) Inventors: Chuanchang Li, Changsha (CN); Baoshan Xie, Changsha (CN); Jian Chen, Changsha (CN)

(73) Assignee: CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 497 days.

(21) Appl. No.: 17/273,322

(22) PCT Filed: Apr. 24, 2019

(86) PCT No.: PCT/CN2019/084088
§ 371 (c)(1),
(2) Date: Mar. 4, 2021

(87) PCT Pub. No.: WO2020/048144
PCT Pub. Date: Mar. 12, 2020

(65) Prior Publication Data
US 2021/0324254 A1 Oct. 21, 2021

(30) Foreign Application Priority Data

Sep. 5, 2018 (CN) .......................... 201811030956.0

(51) Int. Cl.
*F41H 3/00* (2006.01)
*C09K 5/06* (2006.01)
*B05D 1/00* (2006.01)
*B05D 3/00* (2006.01)

(52) U.S. Cl.
CPC .............. *C09K 5/063* (2013.01); *B05D 1/005* (2013.01); *B05D 3/007* (2013.01); *F41H 3/00* (2013.01)

(58) Field of Classification Search
None
See application file for complete search history.

(56) References Cited

U.S. PATENT DOCUMENTS

2015/0346398 A1\* 12/2015 Gorodetsky ............. G02B 5/26
359/359
2021/0063612 A1\* 3/2021 Gorodetsky ............. B32B 5/02

FOREIGN PATENT DOCUMENTS

| CN | 101429423 A | 5/2009 |
|---|---|---|
| CN | 103254664 A | 8/2013 |
| CN | 105669194 A | 6/2016 |
| CN | 107022799 A | 8/2017 |
| CN | 109181650 A | 1/2019 |

\* cited by examiner

*Primary Examiner* — Sheeba Ahmed
(74) *Attorney, Agent, or Firm* — Bayramoglu Law Offices LLC

(57) ABSTRACT

A dynamic thermal infrared stealth composite material based on dual phase change is a $VO_2$/mica-based phase change thermal storage thin layer composite material composed of a $VO_2$ nanoparticle coating and a mica-based phase change thermal storage thin layer, wherein the mica-based phase change thermal storage thin layer consists of stearic acid and a vanadium-extracted mica substrate in a mass ratio of 3-5:5-7. The composite material based on dual phase change is prepared by extracting vanadium from vanadium mica using a roasting and acid leaching process to prepare $VO_2$ nanoparticles and a vanadium-extracted mica, embedding a phase change functional body into the vanadium-extracted mica as a support substrate to prepare a mica-based phase change thermal storage thin layer, and coating the $VO_2$ nanoparticles on the mica-based phase change thermal storage thin layer. The dynamic thermal infrared stealth composite material can synergistically reinforce thermal infrared stealth performance.

3 Claims, 1 Drawing Sheet

DYNAMIC THERMAL INFRARED STEALTH COMPOSITE MATERIAL BASED ON DUAL PHASE CHANGE AND PREPARATION METHOD THEREOF

BACKGROUND

Technical Field

The present invention discloses a dynamic thermal infrared stealth composite material based on dual phase change and a preparation method thereof, and in particular, discloses a VO/mica-based phase change thermal storage thin layer composite material and a preparation method thereof, which belongs to the field of thermal infrared stealth material preparation technologies.

Related Art

With the rapid development of modern military reconnaissance technologies, the survival and safety of military targets face increasingly serious threats. As a counter-reconnaissance means, infrared stealth technology has always been valued by major military powers, because it can improve the survivability and combat effectiveness of military targets. Thermal infrared stealth materials have qualified infrared emissivity and high-efficiency temperature control ability, and become an important way to implement the infrared stealth technology.

SUMMARY

Technical Problems

Vanadium dioxide ($VO_2$) is an inorganic phase change material with a typical characteristic of thermally induced emissivity changes. At a phase change temperature ($T_c$=68° C.), it is subject to a reversible phase change from a semiconductor phase (M phase) having a monoclinic structure with high infrared emissivity at low temperature to a metal phase (R phase) having a rutile structure with low infrared emissivity at high temperature. $VO_2$ has the advantages of reversible phase change, adjustable phase change temperature, and fast thermally induced response, and also has the function of temperature control by means of the latent heat of phase change, which makes it have a large application space as a thermal infrared stealth material. However, when the thermal radiation from a target is excessively large, the infrared radiation load of $VO_2$ increases, making it impossible to rapidly respond to the background infrared radiation.

Organic phase change materials as a temperature control material can be used in the thermal infrared stealth technology. The use of a non-metallic mineral-supported phase change material to prepare a mineral-based composite phase change material is the main research trend for low-cost preparation of a thermal infrared stealth temperature control material. However, it is a main difficulty at present to make full use of mineral properties to prepare the mineral-based composite phase change materials with excellent thermal infrared stealth performance.

Therefore, there is a need to develop a system that combines the advantages of the mineral-based composite phase change materials and $VO_2$. By combining the mineral-based composite phase change materials as a temperature control material with $VO_2$, the radiation load of $VO_2$ during low infrared radiation process is reduced, and the temperature control ability of the phase change materials is fully utilized, which is expected to realize a dynamic thermal infrared stealth with active and rapid response.

Solution to Problems

Technical Solution

An object of the present invention is to provide a dynamic thermal infrared stealth composite material based on dual phase change and a preparation method thereof, which can synergistically reinforce thermal infrared stealth performance, so as to realize a dynamic thermal infrared stealth with active and rapid response.

The present invention is implemented by the following technical solution:

The present invention provides a dynamic thermal infrared stealth composite material based on dual phase change, wherein a $VO_2$/mica-based phase change thermal storage thin layer composite material is composed of a $VO_2$ nanoparticle coating and a mica-based phase change thermal storage thin layer, and the mica-based phase change thermal storage thin layer consists of stearic acid and a vanadium-extracted mica substrate in a mass ratio of 3-5:5-7.

According to the dynamic thermal infrared stealth composite material based on dual phase change of the present invention, in the $VO_2$/mica-based phase change thermal storage thin layer composite material, the $VO_2$ nanoparticle coating has a thickness of 0.1-0.5 mm.

According to the dynamic thermal infrared stealth composite material based on dual phase change of the present invention, the composite material based on dual phase change has a structure constructed by coating $VO_2$ nanoparticles on the mica-based phase change thermal storage thin layer, which can simultaneously regulate and control infrared emissivity and temperature, thus synergistically reinforce thermal infrared stealth performance.

The present invention provides a method for preparing a dynamic thermal infrared stealth composite material based on dual phase change, comprising the following steps:

Step 1: Vanadium Extraction of Vanadium Mica and Preparation of $VO_2$ Nanoparticles crushing a vanadium mica to a particular particle size by ball milling, and then roasting in microwave for 1 h at high temperature to obtain a roasted clinker; mixing sulfuric acid as a leaching solution and the roasted clinker at a liquid-solid ratio of 2-3:1 ml/g with stirring, leaching at a leaching temperature of 90-95° C. for 10-12 h, and filtering, to obtain a vanadium-containing leachate; washing the vanadium-extracted mica and drying for use; adjusting the pH of the vanadium-containing leachate to 2.0-2.5, and after oxidation, adsorption, desorption, and purification, adding an ammonium salt for precipitation to form ammonium metavanadate, filtering, washing, and drying; and adding a reducing agent to the ammonium metavanadate as a reaction raw material and stirring, and then reacting at a reaction temperature of 180-200° C. for 12-48 h by using a hydrothermal method to obtain a primary product of $VO_2$, and annealing to obtain the final $VO_2$ nanoparticles.

Step 2: Preparation of a Mica-Based Phase Change Thermal Storage Thin Layer mixing stearic acid and the vanadium-extracted mica obtained in step 1 in a mass ratio of 3-5:5-7, placing them in a reaction vessel with a vacuum device, ultrasonically heating at 80-95° C. under a vacuum condition for 25-30 min to obtain a mica-based phase change thermal storage composite material, and then pressing the phase change thermal storage composite material, to obtain the mica-based phase change thermal storage thin layer.

Step 3: Preparation of a $VO_2$/Mica-Based Phase Change Thermal Storage Thin Layer Composite Material mixing a dispersing solvent and the $VO_2$ nanoparticles obtained in step 1 at a particular liquid-solid ratio, and ultrasonically stirring to obtain a spin-coating solution with uniformly dispersed $VO_2$ nanoparticles, spin coating the mica-based phase change thermal storage thin layer obtained in step 2 as a spin-coating substrate with the spin coating solution, and drying at a room temperature, to obtain the $VO_2$/mica-based phase change thermal storage thin layer composite material after multiple times of spin coating.

According to the method for preparing a dynamic thermal infrared stealth composite material based on dual phase change of the present invention, in step 1, the roasting in microwave for 1 h at high temperature is carried out at a roasting temperature of 800-900° C.

According to the method for preparing a dynamic thermal infrared stealth composite material based on dual phase change of the present invention, in step 1, the reducing agent is selected from at least one of oxalic acid, formic acid, ethanol, amines, and hydroquinone.

According to the method for preparing a dynamic thermal infrared stealth composite material based on dual phase change of the present invention, in step 1, the annealing to obtaining the final $VO_2$ nanoparticles is carried out at an annealing temperature of 500-550° C. for 5-8 h.

According to the method for preparing a dynamic thermal infrared stealth composite material based on dual phase change of the present invention, in step 2, the pressing the phase change thermal storage composite material is carried out at a pressing pressure of 10-16 MPa.

According to the method for preparing a dynamic thermal infrared stealth composite material based on dual phase change of the present invention, in step 3, the dispersing solvent is selected from at least one of distilled water and ethanol.

Principles and Advantages (1) In the present invention, by combining a mineral-based composite phase change material as a temperature control material with $VO_2$ having thermally induced phase change thermal infrared stealth performance, a dual phase change composite material is produced, which can synergistically reinforce thermal infrared stealth performance. When the composite material is used in infrared stealth technology, infrared emissivity and target surface temperature can be simultaneously regulated and controlled, so that the target actively and rapidly responds to dynamic thermal infrared stealth. In the composite material, the mineral-based composite phase change material can reduce the target surface temperature, reduce radiant energy, fully utilize the temperature control ability of the phase change material, reduce the radiation load of $VO_2$ during the low infrared radiation, and overcome the shortcomings of $VO_2$; and a mica substrate with a high thermal conductivity can overcome the shortcomings of stearic acid phase change material with a low thermal conductivity, and can respond to temperature changes more rapidly and actively during the temperature control process.

(2) In the present invention, in order to make full use of mineral properties, a roasting and acid leaching process is used to extract vanadium from vanadium mica, obtaining a leachate with a high proportion of pentavalent vanadium and a vanadium-extracted mica with significant thermal storage characteristics. The leachate is used as a vanadium source to prepare $VO_2$ nanoparticles, during which the morphology and particle size of the $VO_2$ nanoparticles are controlled by optimizing the reaction process. The vanadium-extracted mica is used as a support substrate to embed a phase change functional body to prepare a mica-based phase change thermal storage thin layer based on the mineral-based composite phase change material, which can overcome the problem of phase change leakage of the phase change material, and make full use of the advantages of raw materials. Furthermore, the roasting process can destroy the mica lattice to increase the leaching rate of vanadium and increase the porosity of the mica, and the porous characteristic of the vanadium-extracted mica helps the embedding of the phase change functional body and prevents the phase change leakage.

Based on the above, the present invention makes full use of the mineral properties of the vanadium mica to prepare the dynamic thermal infrared stealth composite material based on dual phase change, which can synergistically reinforce thermal infrared stealth performance, and expand the application range of mineral functional materials.

Figure 1:
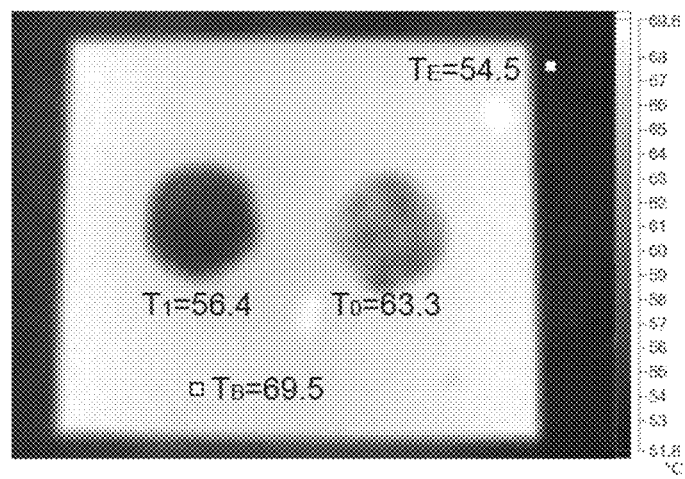
FIG. 1 is grayscale images of the products prepared in Example 1 and Comparative Example 1 obtained by infrared thermographic camera.

As can be seen from FIG. 1, in the infrared stealth performance test, the temperature of sample 1 prepared in Example 1 ($T_1$=56.4° C.) is closer to the environmental temperature ($T_E$=54.5° C.) than the temperature of sample 0 prepared in Comparative Example 1 ($T_0$=63.3° C.), indicating that the prepared dual phase change material has a better ability of adjusting temperature and infrared emissivity, and can rapidly adapt to the environmental background temperature, and thus has better infrared stealth performance.

Figure 2:
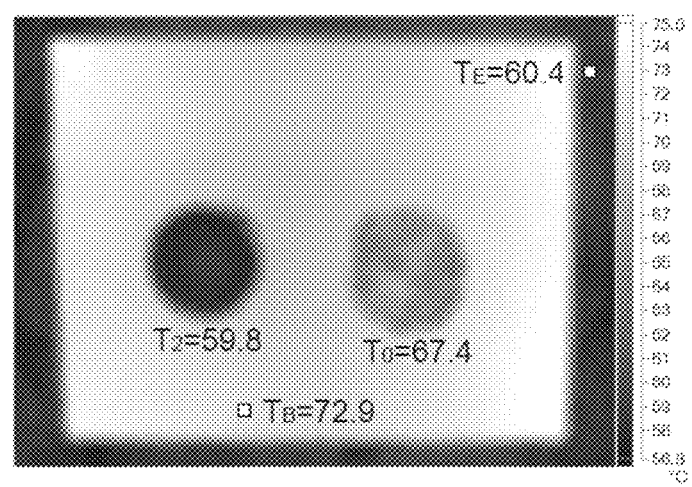
FIG. 2 is grayscale images of the products prepared in Example 2 and Comparative Example 1 obtained by infrared thermographic camera.

As can be seen from FIG. 2, in the infrared stealth performance test, the temperature of sample 2 prepared in Example 2 ($T_2$=59.8° C.) is closer to the environmental temperature ($T_E$=60.4° C.) than the temperature of sample 0 prepared in Comparative Example 1 ($T_0$=67.4° C.), indicating that the prepared dual phase change material has a better ability of adjusting temperature and infrared emissivity, and can rapidly adapt to the environmental background temperature, and thus has better infrared stealth performance.

Figure 3:
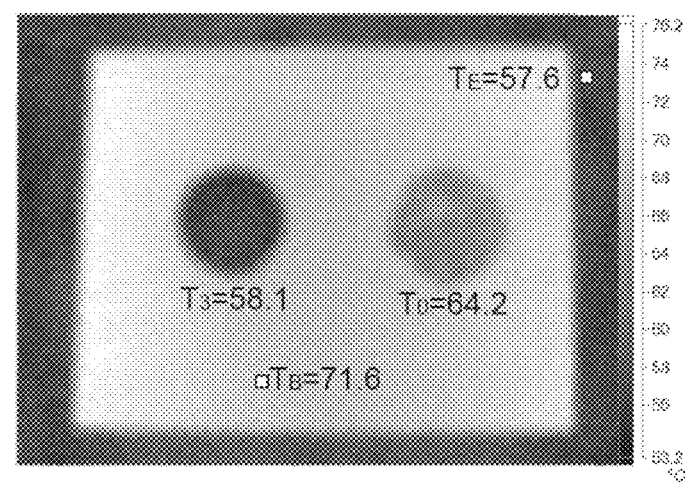
FIG. 3 is grayscale images of the products prepared in Example 3 and Comparative Example 1 obtained by infrared thermographic camera.

As can be seen from FIG. 3, in the infrared stealth performance test, the temperature of sample 3 prepared in Example 3 ($T_3$=58. PC) is closer to the environmental temperature ($T_E$=57.6° C.) than the temperature of sample 0 prepared in Comparative Example 1 ($T_0$=64.2° C.), indicating that the prepared dual phase change material has a better ability of adjusting temperature and infrared emissivity, and can rapidly adapt to the environmental background temperature, and thus has better infrared stealth performance.

DETAILED DESCRIPTION

The present invention is further described in detail below with reference to specific examples, but it is not intended to merely limit the scope of the present invention to the following examples.

Example 1

1 kg of a vanadium mica was crushed to a particle size at a millimeter scale by ball-milling, and then roasted in microwave for 1 h at a temperature of 850° C. to obtain a roasted clinker. Sulfuric acid as a leaching solution was mixed with the roasted clinker at a liquid-solid ratio of 2:1 ml/g with stirring, and reacted at a leaching temperature of 95° C. for 12 h, to obtain a vanadium-containing leachate and a vanadium-extracted mica. The vanadium-extracted mica was washed and dried for use. The pH of the leachate was adjusted to 2.0. Sodium chlorate was added for oxidation, and saturated resin was added for adsorption, desorption and purification. An ammonium salt was then added for precipitation to form ammonium metavanadate, and then filtered, washed, and dried. 0.8 ml/L of an oxalic acid reducing agent solution was added dropwise to the ammonium metavanadate and stirred for 10 min, and then reacted at a reaction temperature of 180° C. for 12 h by using a hydrothermal method, to obtain a primary product of vanadium dioxide ($VO_2$), which was further annealed at 550° C. for 6 h to obtain the final $VO_2$ nanoparticles.

Stearic acid and the vanadium-extracted mica were mixed in a mass ratio of 3:7, and then placed in an Erlenmeyer flask reaction vessel with a vacuum device. After evacuating to −0.05 MPa, the resulting mixture was ultrasonically heated at 80° C. for 25-30 min. Then, the evacuation was stopped, and air was allowed to return to the vessel. After cooling, a mica-based phase change thermal storage composite material was obtained. The phase change thermal storage composite material was further pressed in a mold with a diameter of 2 mm at a pressure of 10 MPa, to obtain a mica-based phase change thermal storage thin layer.

Ethanol as a dispersing solvent and the $VO_2$ nanoparticles obtained above were mixed at a liquid-solid ratio of 100:5 ml/g and ultrasonically stirred for 30 min to obtain a spin-coating solution with uniformly dispersed $VO_2$ nanoparticles. The spin-coating solution was spin-coated onto the mica-based phase change thermal storage thin layer as a spin-coating substrate at a rotating speed of 2000 r/min, and dried at room temperature for 3 h. After multiple times of spin coating, a $VO_2$/mica-based phase change thermal storage thin layer composite material coated with a $VO_2$ nanoparticle coating of about 0.2 mm was obtained, which was marked as sample 1.

According to the criterion for evaluating infrared stealth, the infrared stealth performance was tested by using an infrared thermographic camera Fluke Thermography TiS50 as follows. The dual phase change material obtained above (sample 1) and a pure phase change material (sample 0) in Comparative Example 1 were charged into a glass mold and placed on a rectangular heating plate at 68-73° C. for a period of time. As shown in the grayscale images of FIG. 1, when the plate temperature was $T_B$=69.5° C., and the environmental temperature was $T_E$=54.5° C., sample 1 ($T_1$=56.4° C.) had a temperature closer to the environmental temperature than sample 0 ($T_{01}$=63.3° C.), and had a lower infrared emissivity. Therefore, the prepared dual phase change material had a better ability of adjusting temperature and infrared emissivity, and can rapidly adapt to the environmental background temperature, and thus had better infrared stealth performance.

Example 2

According to the same method and conditions as those in Example 1, a mica-based phase change thermal storage composite material was prepared (except that the mass ratio of stearic acid to a vanadium-extracted mica was changed into 4:6) and a mica-based phase change thermal storage thin layer was then obtained; $VO_2$ nanoparticles were spin-coated with the same number of spin coating, and finally, a $VO_2$/mica-based phase change thermal storage thin layer composite material was obtained, which was marked as sample 2.

According to the criterion for evaluating infrared stealth, the infrared stealth performance was tested by using an infrared thermographic camera Fluke Thermography TiS50 as follows. The dual phase change material obtained above (sample 2) and a pure phase change material (sample 0) in Comparative Example 1 were charged into a glass mold and placed on a rectangular heating plate at 68-73° C. for a period of time. As shown in the grayscale images of FIG. 2, when the plate temperature was $T_B$=72.9° C., and the environmental temperature was $T_E$=60.4° C., sample 1 ($T_2$=59.8° C.) had a temperature closer to the environmental temperature than sample 0 ($T_{02}$=67.4° C.), and had a lower infrared emissivity. Therefore, the prepared dual phase change material had a better ability of adjusting temperature and infrared emissivity, and can rapidly adapt to the environmental background temperature, and thus has better infrared stealth performance.

Example 3

According to the same method and conditions as those in Example 1, a mica-based phase change thermal storage composite material was prepared (except that the mass ratio of stearic acid to a vanadium-extracted mica was changed into 5:5) and a mica-based phase change thermal storage thin layer was then obtained; $VO_2$ nanoparticles were spin-coated with the same number of spin coating, and finally, a $VO_2$/mica-based phase change thermal storage thin layer composite material was obtained, which was marked as sample 3.

According to the criterion for evaluating infrared stealth, the infrared stealth performance was tested by using an infrared thermographic camera Fluke Thermography TiS50 as follows. The dual phase change material obtained above (sample 3) and a pure phase change material (sample 0) in Comparative Example 1 were charged into a glass mold and placed on a rectangular heating plate at 68-73° C. for a period of time. As shown in the grayscale images of FIG. 3, when the plate temperature was $T_B$=71.6° C., and the environmental temperature was $T_E$=57.6° C., sample 1 ($T_3$=58.1° C.) had a temperature closer to the environmental temperature than sample 0 ($T_0$=64.2° C.), and had a lower infrared emissivity. Therefore, the prepared dual phase change material had a better ability of adjusting temperature and infrared emissivity, and can rapidly adapt to the environmental background temperature, and thus had better infrared stealth performance.

Comparative Example 1

Stearic acid was used as a pure phase change material and pressed under the same pressure of 10 MPa as the mica-based phase change thermal storage thin layer to obtain a stearic acid thin layer, which was marked as sample 0.

What is claimed is:

1. A dynamic thermal infrared stealth composite material based on a dual phase change, comprising a $VO_2$ nanoparticle coating and a mica-based phase change thermal storage thin layer, wherein the mica-based phase change thermal storage thin layer consists of stearic acid and a vanadium-extracted mica in a mass ratio of 3-5:5-7.

2. The dynamic thermal infrared stealth composite material according to claim 1, wherein in the dynamic thermal infrared stealth composite material, the $VO_2$ nanoparticle coating has a thickness of 0.1-0.5 mm.

3. The dynamic thermal infrared stealth composite material according to claim 1, wherein the dynamic thermal infrared stealth composite material is produced by coating $VO_2$ nanoparticles on the mica-based phase change thermal storage thin layer, wherein the dynamic thermal infrared stealth composite material simultaneously regulates and controls infrared emissivity and temperature, and the dynamic thermal infrared stealth composite material synergistically reinforces thermal infrared stealth performance.

* * * * *